July 26, 1960

G. G. BRANNING ET AL 2,946,601

MOVING VAN

Filed April 22, 1958

INVENTORS
GEORGE G. BRANNING
RICHARD A. ESPINOZA
BY

*L. Lee Humphries*

ATTORNEY

July 26, 1960   G. G. BRANNING ET AL   2,946,601
MOVING VAN

Filed April 22, 1958   3 Sheets-Sheet 3

INVENTORS
GEORGE G. BRANNING
RICHARD A. ESPINOZA
BY
L. Lee Humphries
ATTORNEY

United States Patent Office

2,946,601
Patented July 26, 1960

2,946,601

MOVING VAN

George G. Branning, 337 10th St., San Pedro, Calif., and Richard A. Espinoza, 2216 Delaware, Santa Monica, Calif.

Filed Apr. 22, 1958, Ser. No. 730,162

4 Claims. (Cl. 280—46)

This invention relates to a moving van particularly adapted to move or store freight and, further, a moving van which is easily moved even when loaded, by one or two persons. The container portion is preferably collapsible so as to be compactly stored or transported.

In the hauling of freight, it has been found that packing or loading into containers adds considerably to the weight which is then handled in transit. However, the reduced cost of handling, where freight is packaged in containers and handled as taught in this invention, more than offsets the increased shipping expenses. In order to further reduce cost of handling and shipping, applicants have devised a rigid, yet collapsible, container together with means for providing mobility to the container with a minimum of physical effort. A power cart is provided which, together with the container forms a mobile unit which can be pulled or driven into place by one or two persons. Ordinarily, the cart portion is not shipped but remains at the terminals where freight is handled.

The collapsible container is often shipped empty on return trips and is desirably collapsible in order to take up a minimum of space. The collapsed containers must also be handled, stored, and carted empty. Applicants have made provision in this invention for easily moving the collapsed containers.

The invention is one of simplicity and it economically accomplishes the desired ends in freight handling, hauling and transporting. It allows much larger loads to be handled by fewer men and so increases the freight handled in a given period of time. At the same time, the collapsible container is designed to have rigidity and strength in carrying and protecting its load. When, extended into its transporting mode, the container is strong and rugged and does not merely telescope against its contents when forces are brought to bear upon it.

The collapsible moving van may be carted from place to place, while loaded, without the necessity of slings or straps or other hoisting equipment. In carting, the van is only slightly tilted and thus the freight within has little chance of shifting or changing position from its original placement within the container.

It is therefore an object of this invention to provide a moving van which is easily carted.

It is another object of this invention to provide a moving van which provides mobility for large loads.

Another object of this invention is to provide a moving van having strength and rigidity for the protection of its contents.

Still another object is to provide a collapsible container which may be shipped or carted in collapsed condition.

A further object of this invention is to provide a cart for moving loaded containers.

A final object of this invention is to provide a simple, effective device for handling freight.

Still other objects and features may be observed from the drawings and the accompanying description in which Fig. 1 is a side view of the moving van;

Figure 1:
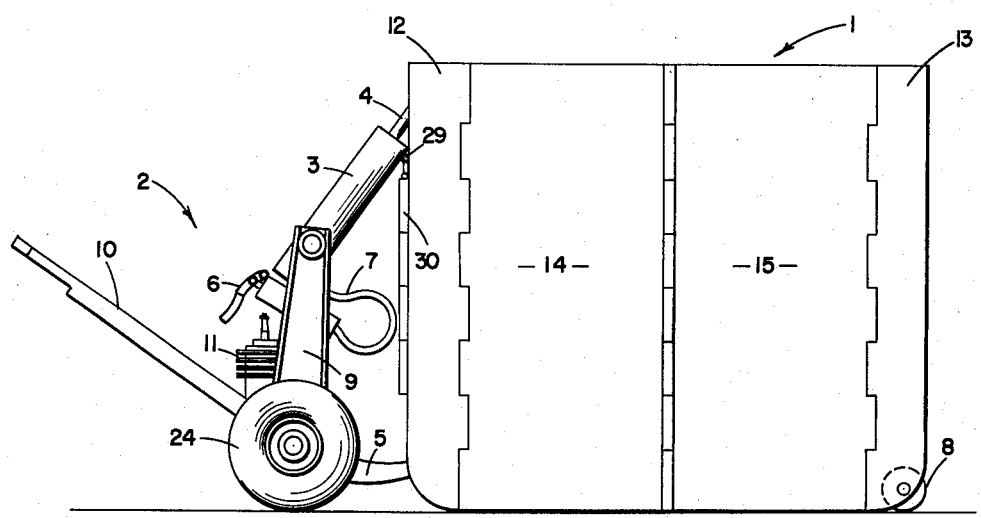

Referring now to Fig. 1, a container 1 is adapted to be moved by a cart 2. A power source, described herein as a "lift," is shown in this illustration as being comprised of a hydraulic cylinder 3 having an extension rod 4, engages container 1 simultaneously with stub 5. Pump 6 provides pressure through tube 7 to cylinder 3 to cause rod 4 to extend and lift container 1 onto its rear roller means, or wheel means 8 as may be seen by momentary reference to Figs. 3 or 4.

Figure 2:
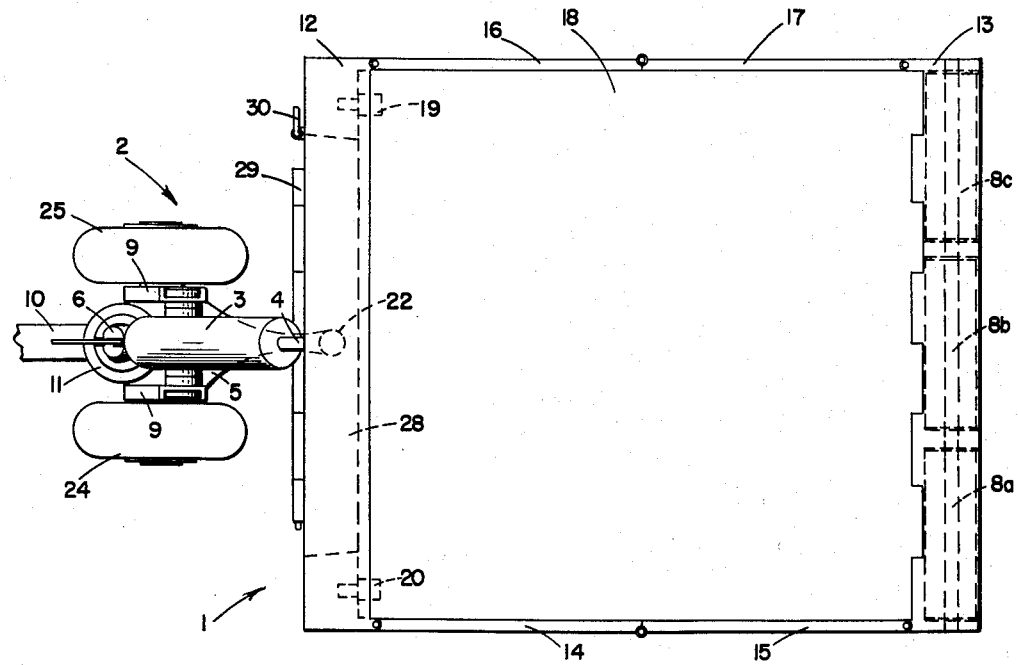
Fig. 2 is a top view of the moving van.

As rod 4 extends, frame 9 moves forward and lowers tongue 10 to which it is preferably rigidly attached, although not necessarily. Small gas motor 11 may be provided as a source of power to aid in moving the container and cart. In some instances the motor may be dispensed with. It may be seen in Fig. 1 that the container consists of a front panel 12 and back panel 13 hinged to side panels 14 and 15 which are also hinged together. In Fig. 2 it may be seen that front and back panels 12 and 13 are also connected to two other side panels 16 and 17. Also in Fig. 2, if may be seen that a top panel 18 is hinged at the top of back panel 13 and is held in place by stops, or catches, 19 and 20, shown in dotted lines. Fig. 2 shows rollers 8a, 8b, and 8c as being recessed within the back panel limits of the container 1. Fig. 1 also shows the roller means as being approximately in line with the bottom of the container 1. Such construction, at least with respect to the bottom, allows no rolling or sliding on the rollers while the container sits flat, yet upon slight tilting the rollers or wheels are in rolling position and the load is easily moved.

Figure 3:
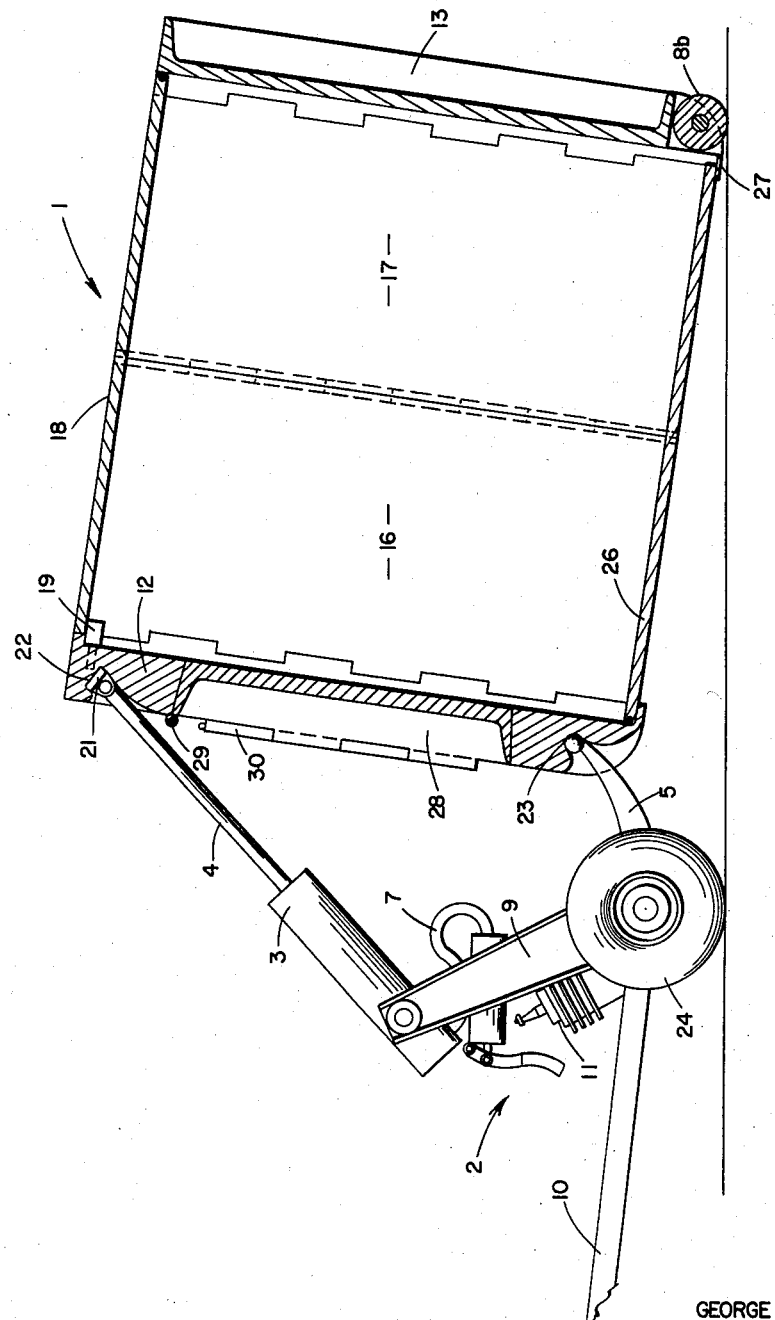
Fig. 3 is a side view of the moving van, with the container cut away to show interconnection of the cart and container and, also, the folding portions of the container.
Figure 4:
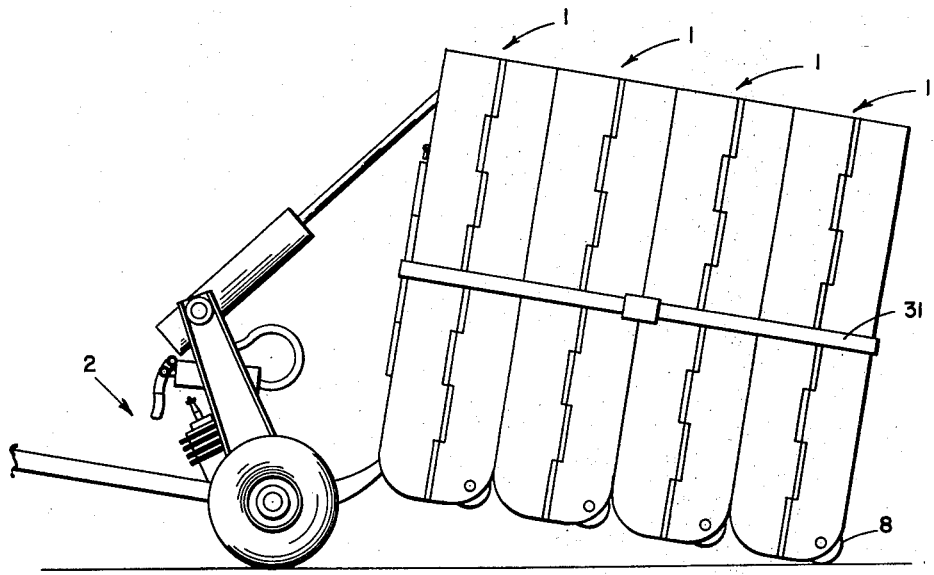
Fig. 4 is a side view showing the cart attached to carry several collapsed containers.

Fig. 3 shows the container portion of the moving van cut away, more clearly illustrating the engagement of extension rod 4. Shoe 21 connected at the end of rod 4 engages front panel 12 in socket 22. Stub 5, terminating in a rounded portion, engages socket 23, also in front panel 12. Stub 5 together with frame 9 provides a lifting lever for the cart. As frame 9 is forced forward, stub 5, acting as one lever end, tilts container 1 back on its rear rollers, in aid of lift 3. The fulcrum of the lifting lever is provided, of course, by the wheels 24 and 25 and their interconnecting axle, or mounting structure.

When extension rod 4 moves from a retracted position to an extended position, it forces the frame 9 forward. Frame 9 which is rigidly connected with respect to stub 5 acts to lift stub 5 and, consequently, lift container 1. Thus, container 1 is lifted onto its back wheels (shown at 8b) and is then carried by its back wheels and the wheels 24 and 25 of the cart. Tongue 10 is thus lowered and the whole moving van can be controlled, moved forward, backward or turned by one or two persons. As pointed out above, stub 5 is shaped at its end so as to be rounded, and, therefore, with socket 23 provides structure substantially similar to a ball and socket type joint. The rounded portion of stub 5 allows the cart to be turned to one side or the other in front of the container so as to guide it in either direction. Additional flexibility may be secured by fitting shoe 21 so as to be rotatable about an axis which lies in the plane of the drawing rather than perpendicular to it as shown in Fig. 3.

In Fig. 3, it may be more clearly noted how top panel 18 is hinged to back panel 13 and how it is held in place by stops such as 19 and 20 in Fig. 2. Bottom panel 26 may also be seen to be hinged oppositely from panel 18, it being hinged at the front at panel 12 and extending to rest on foot 27 at the rear panel 13. A front door 28 is connected at its top by hinge 29 and at one side by hinge 30. Removal of the pintle of either hinge will allow the door 28 to swing open.

Container 1 may be collapsed, when empty by removing catches or stops 19 and 20 and allowing top panel 18 to fall downwardly and to the rear. It clears bottom panel 26, so that that panel may be lifted clear of the foot 27 on which it rests and folded upwardly and forwardly to lie against front panel 12. This construction is unique in that is provides a compact folding arrangement of simple construction. Panels 12 and 13 can be made, in actual practice, of less width than is shown in the drawing and, thus, when the container is folded in the manner shown, it is quite flat and occupies a minimum of space. Were these panels hinged to the same panel (front or back) difficulty would then be experienced in making them the same length and still interfold them.

Figure 5:
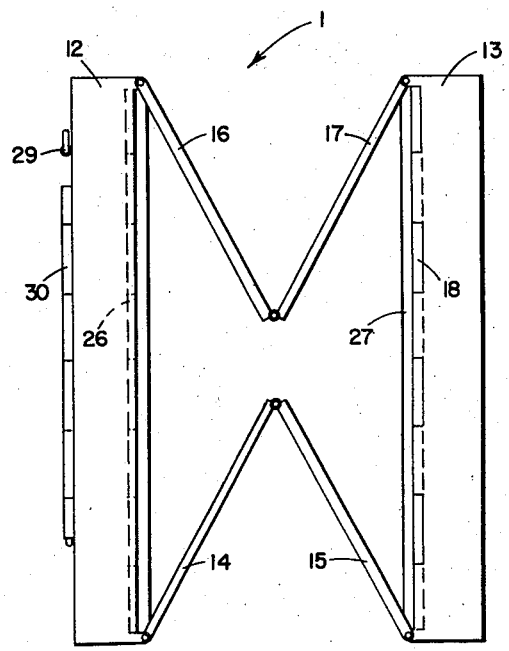
Fig. 5 is a top view of the container in nearly collapsed condition.

The container may be collapsed as indicated in Fig. 5. Top and bottom panels 18 and 26 lie out of the way and fully clear of the folding of the side panels 14, 15, 16 and 17. As the container folds, it becomes a tightly interlocked package. Top and bottom panels, 18 and 26 are held tightly in place as the panels 14, 15, 16 and 17 fold against them, preventing any swinging or freedom of motion. All panels are thus stored within the container and firm against the other panels, making for less chance of breakage or springing of the panels singly or of the container as a whole. The container 1 is more fully shown collapsed in Fig. 4, wherein is shown four such containers fully collapsed and bound together by a strap 31. While strapped together, several containers may still be handled as one. Cart 2 engages the frontmost of them and lifts them so as to place the wheel of the hindmost in rolling position. The wheels of the intermediate containers are thus lifted off the ground. They, however, may touch the ground if the containers are strapped together obliquely or allowed, for example, to slide downwardly in Fig. 4 with respect to each other, each wheel then touching the ground and carrying the weight of its own load which will be nearly balanced thereon.

The device of the invention provides a ready means to handle large amounts of freight with a minimum of manpower. It is constructed so that the container in combination with the cart provides a moving van which is mounted on rolling wheels. A rolling mount is obtained whether the container is extended into loaded position or collapsed alone or with others. Upon removal of the cart, the container assumes a stable position with no chance of rolling. It is an important feature of the invention that a collapsible container although extended and loaded if carted and handled by the concept taught herein, will not suffer from the usual shortcomings of other collapsible containers which provide little, if any, rigidity, and cannot rely upon their own rigidity or strength in carting.

Although the invention has been described and illuustrated in detail, it is to be clearly understood that the same is by way of illustration and example only and is not to be taken by way of limitation, the spirit and scope of this invention being limited only by the terms of the appended claims.

We claim:

1. In combination, a plurality of collapsed containers, means for securely binding said collapsed containers together, at least one of said containers having rolling means, said rolling means being effective only upon tilting of said container, carting means cooperatively associated with said collapsed containers, said carting means comprising a lift, a lifting lever, wheel and axle means providing a fulcrum for said lifting lever, said lift operable between one end of said lifting lever and one of said collapsible containers, the other end of said lifting lever engaging said latter one of said collapsible containers in lifting position, whereby said collapsible containers are tilted onto said rolling means.

2. A moving van comprising a container portion having a front portion and a back portion, roller means located at said back portion, said rolling means disposed so as to carry a portion of the load of said container as said container is tilted backwardly, carting means cooperatively associated with said container, said carting means having a lift, a lifting lever operable to tilt said container backwardly, wherein said lifting lever is provided with a fulcrum, said lifting lever having a portion on the remote side of said fulcrum from said container and said lifting lever also having a portion on the near side of said fulcrum from said containers, and wherein one end of said lift is operable to engage said container and the other end of said lift acts upon the portion of said lifting lever on the remote side of said fulcrum from said container and the portion of said lifting lever on the near side of said fulcrum from said container being operable to engage and lift said container.

3. A moving van comprising a container portion having a front portion and a back portion, roller means located at said back portion, said roller means located so as to carry a portion of the load of said container as said container is tilted backwardly, carting means cooperatively associated with said container, said carting means having a lift, a lifting lever operable to tilt said container backwardly, wherein said lifting lever is provided with a fulcrum, and wherein one end of said lift engages said container and the other end of said lift acts upon said lifting lever on the remote side of said fulcrum from said container and wherein one end of said lift engages the upper portion of said container and the other end of said lift engages said lifting lever at one end of said lifting lever, and the other end of said lifting lever engages the bottom portion of said container.

4. A moving van comprising a container portion having a front portion and a back portion, roller means located at said back portion, said roller means located so as to carry a portion of the load of said container as said container is tilted backwardly, carting means cooperatively associated with said container, said carting means having a lift, a lifting lever operable to tilt said container backwardly, wherein said lifting lever is provided with a fulcrum, and wherein one end of said lift engages said container and the other end of said lift acts upon said lifting lever on the remote side of said fulcrum from said container and wherein one end of said lift engages the upper portion of said container and the other end of said lift engages said lifting lever at one end of said lifting lever, and the other end of said lifting lever engages the bottom portion of said container, and wherein further, said cart comprises wheel and axle means mounted to form the fulcrum of said lifting lever.

References Cited in the file of this patent

UNITED STATES PATENTS

| 1,533,987 | Germond | Apr. 14, 1925 |
| 1,693,700 | McCall | Dec. 4, 1928 |
| 1,750,639 | Jones | Mar. 18, 1930 |
| 1,799,233 | Holan | Apr. 7, 1931 |
| 2,094,522 | Blake | Sept. 28, 1937 |
| 2,148,090 | Turner | Feb. 21, 1939 |
| 2,668,062 | Drummond | Feb. 2, 1954 |

FOREIGN PATENTS

| 500,853 | Belgium | Feb. 15, 1951 |